United States Patent [19]

Aoki

[11] Patent Number: 5,632,593
[45] Date of Patent: May 27, 1997

[54] VEHICLE LIFT WITH TAPERED CONTACT SENSOR

[75] Inventor: Lawrence S. Aoki, Modesto, Calif.

[73] Assignee: Lift-U, Division of Hogan Mfg., Inc., Escalon, Calif.

[21] Appl. No.: 639,193

[22] Filed: Apr. 26, 1996

[51] Int. Cl.⁶ .................................................. B60P 1/44
[52] U.S. Cl. ........................... 414/541; 414/545; 414/921
[58] Field of Search ................................. 414/522, 540, 414/541, 545, 921

[56] References Cited

U.S. PATENT DOCUMENTS

| | | |
|---|---|---|
| 2,797,104 | 6/1957 | Drobney et al. . |
| 3,588,160 | 6/1971 | Reiner . |
| 3,955,827 | 5/1976 | Wonigar . |
| 3,984,014 | 10/1976 | Pohl . |
| 4,071,152 | 1/1978 | Kinkead et al. . |
| 4,134,504 | 1/1979 | Salas et al. . |
| 4,251,179 | 2/1981 | Thorley . |
| 4,369,984 | 1/1983 | Hagen . |
| 4,392,771 | 7/1983 | Smalley . |
| 4,407,623 | 10/1983 | Parks . |
| 4,466,771 | 8/1984 | Thorley et al. . |
| 4,544,321 | 10/1985 | Lanier . |
| 4,576,539 | 3/1986 | Williams . |
| 4,583,466 | 4/1986 | Reddy et al. . |
| 4,671,730 | 6/1987 | Gateau . |
| 4,751,983 | 6/1988 | Leskovec et al. . |
| 4,787,111 | 11/1988 | Pacek et al. . |
| 4,909,700 | 3/1990 | Fontecchio et al. . |
| 4,928,330 | 5/1990 | Moore . |
| 4,941,216 | 7/1990 | Boublil . |
| 5,052,879 | 10/1991 | Wolfe . |
| 5,158,419 | 10/1992 | Kempf et al. . |
| 5,299,904 | 4/1994 | Simon et al. . |

*Primary Examiner*—Thomas J. Brahan
*Attorney, Agent, or Firm*—Christensen O'Connor Johnson & Kindness PLLC

[57] ABSTRACT

A vehicle lift for transporting a wheelchair passenger between a ground-level position adjacent the vehicle to a position adjacent and substantially coplanar with the vehicle floor. The lift includes a pair of rails (36) attached to the vehicle. A carriage assembly (21) includes a pair of slides (34) that ride on the rails (36). The lift further includes a contact sensor (16) for detecting when the lift platform (25) contacts a curb or other object. As the platform is lowered, the relative position of the slides (34) and the rails (36) changes, the sensor (16) detects a relative position of one of the slides (34) and the corresponding rail (36). When the sensor (16) detects a relative position of the slide (34) and the rail (36) indicating that the platform (25) has contacted a curb or other object, the sensor (16) generates a control signal. A lift controller (60) stops the lowering of the platform in response to the control signal from the sensor (16). A tapered outer portion (80) on the slide (34) allows an increase in the angular displacement of the slides (34) with respect to the rails (36).

12 Claims, 6 Drawing Sheets

VEHICLE LIFT WITH TAPERED CONTACT SENSOR

FIELD OF THE INVENTION

The present invention relates to a lift for use in a transit vehicle, and more particularly, to a lift having a contact sensor for use during lowering of the lift platform to detect if the lift platform has contacted a curb or other object.

BACKGROUND OF THE INVENTION

A number of lifts have been developed in order to aid disabled persons, in particular, wheelchair passengers, in boarding and exiting vehicles such as buses, trains, vans, and the like. One type of lift, commonly known as a "step lift," is disclosed in U.S. Pat. No. 4,466,771 to Thorley et at. ("the '771 patent"). The step lift is designed to be installed in the stairwell of a transit vehicle, and includes hinged panels that are movable between a step position and a platform position. In the step position, the hinged panels form steps for use by passengers to board and exit the vehicle. In the platform position, the hinged panels form a horizontal platform for use to raise and lower a wheelchair passenger between a vehicle's floor-level position and a ground-level position. The hinged panels are attached to a carriage assembly that may be driven upward or downward to raise or lower the platform.

A second type of lift, commonly known as a "platform lift," is designed to be used in a vehicle where steps are not needed. In a platform lift, a solid platform rests in a vertical or horizontal position when not in use, and may be hidden underneath the vehicle. The platform is lowered to the ground or curb, and raised to its resting position, in order to transport the passenger between the ground and the vehicle.

Typically, passengers board and exit a bus from a curb along the edge of a street. A lift generally is configured such that the carriage assembly has a lowermost point of travel that enables lowering of the platform to a street level position in order to accommodate wheelchair passengers in those instances in which boarding or exiting of the vehicle occurs from the street level rather than from a curbside. Thus, in cases where there is a curb, the height of the curb is above the lowermost point of travel of the cartage assembly. It is important to stop downward movement of the cartage assembly, i.e., lowering of the platform, at the time that the platform contacts a curb or other object. If lowering of the platform is not stopped at that time, the lift may be damaged, a passenger on the lift may be frightened and/or injured, and/or the lift may jack the vehicle.

A number of different arrangements for stopping lowering of a lift platform when the platform contacts a curb or other object have been developed. For example, the '771 patent discloses a wheelchair lift in which a sensitive edge is provided on the bottom of the platform. When the sensitive edge contacts an object, a switch is actuated to stop the motor, and hence lowering of the platform. Since it is located on the underside of the platform, the sensitive edge is susceptible to damage from ground abrasion and also to deterioration from rust, dirt, ice, or the like.

U.S. Pat. No. 5,299,904 to Simon et at. ("the '904 patent") discloses a lift with a contact sensor that is protected from the environment. The lift disclosed in the '904 patent includes two rails attached to a vehicle, and two slides that ride upon the rails. A carriage and a platform are attached to the slides. The carriage and platform normally rest in a position above the level of a curb or the ground. As the platform is lowered to the curb, the attached slides extend away from the vehicle, riding upon the rails.

A contact sensor is situated on the bottom surface of the top part of the slide, so that it can detect whether the top of the rail is contacting the slide at the point of the sensor. As the platform is lowered to the curb, prior to contact with the curb, the weight of the platform is supported entirely by the rail. After the platform contacts the curb and continues to be lowered, a portion of the weight is transferred from the rail to the curb. As the platform continues to be lowered, the inner portion of the slide becomes lower than the outer portion of the slide. When this occurs, there is no longer contact between the rail and the slide at the point of the contact sensor. The sensor, detecting the change in position, sends a signal to a lift controller, which terminates the lowering of the platform.

One weakness of the '904 invention is that there is little tolerance between the slide and the contact sensor. Thus, as the vehicle on which the lift is mounted rocks back and forth once the lift platform is lowered to the curb, the rocking tends to repeatedly trigger the contact sensor. As the contact sensor is repeatedly triggered, it causes the outer safety barrier to attempt to move between an extended position and a safety barrier position. Thus, the contact sensor does not always provide a correct indication of whether or not the platform is properly lowered and rested upon the curb.

As can be seen from the discussion above, there exists a need for an improved apparatus to detect when the platform contacts the curb. The present invention is directed toward addressing this need.

SUMMARY OF THE INVENTION

The present invention is a wheelchair lift designed for use with a transit vehicle, such as a bus, for helping the disabled passenger, e.g., a wheelchair occupant, to board and exit the vehicle. The wheelchair lift includes a lift platform that moves between the level of the vehicle floor and the level of the curb or ground. The lift includes a mechanism for raising the lift platform from the ground to the vehicle floor level and for lowering the lift platform back to the ground. The lift also includes a sensor for detecting when the lift platform has contacted the ground. The sensor provides a signal to the raise/lower mechanism that instructs the mechanism to stop the downward movement of the lift platform.

One embodiment of the wheelchair lift includes a carriage attachable to the vehicle and movable between an upper position and a lower position. The carriage includes a pair of horizontally extending support members, or rails. The outer portion of the rails, the end opposite the vehicle, is tapered so that the end of each rail is narrower in the vertical dimension than the middle of the rail. A platform is attached to the carriage and moves up and down with the carriage. The platform includes a pair of slides that slide upon and are supported by the rails. The rails interact with the slides so that the tapered portion of the rails allow the slides and thus the platform to be angularly displaced with respect to the rails when the carriage and platform are in the lowered position. The lift also includes a mechanism that moves the carriage and platform between the upper and lower positions and a sensor that detects the angular displacement of the rails with respect to the slides in order to produce a control signal. The control signal is indicative of when the platform and carriage are in the lower position and the rails are angularly displaced with respect to the slides. The mechanism receives the control signal from the sensor and stops the downward movement of the carriage and platform in response to the control signal.

In accordance with other aspects of the invention, the lower position of the slide and platform corresponds to the point at which the slides and platform contact a curb or ground. The sensor's detection of the lower position occurs at approximately the point at which the platform contacts the curb, and the control signal provides an indication of when the platform has contacted the curb.

In accordance with still other aspects of the invention, the lift may be a step lift or a platform lift. In a configuration in which the lift is a step lift, the lift includes a step/platform assembly having hinged panels pivotally connected to each other that form at least one step in a step position and form a generally flat platform in a platform position. The hinged panels are connected to the pair of slides that ride on the pair of horizontal rails. When the slides are extended, the hinged panels become a platform. The platform may be moved between an upper position and a lower position. The lift also includes an extension/retraction mechanism for causing the step/platform assembly to move between the step and platform positions, and a raise/lower mechanism for causing the platform to move between the upper and lower positions.

The invention's use of a rail in which the outer portion is tapered allows the slide and the rail to be angularly displaced with respect to each other when the platform assembly is in the lower position. The tapered rail allows a greater angular displacement of the slides with respect to the rails before the rails become supported by the slides. This extra angular displacement allows a sensor to detect the angular displacement and stop the lowering of the platform without being susceptible to rocking of the vehicle on which the wheelchair lift is mounted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The following description is of the presently contemplated best mode of carrying out the invention. Although the invention is described with reference to a step lift for helping a wheelchair passenger to board and exit a bus, the invention may be used in a platform lift where it is desirable to stop movement of the lift when the platform reaches a desired position.

Figure 1:
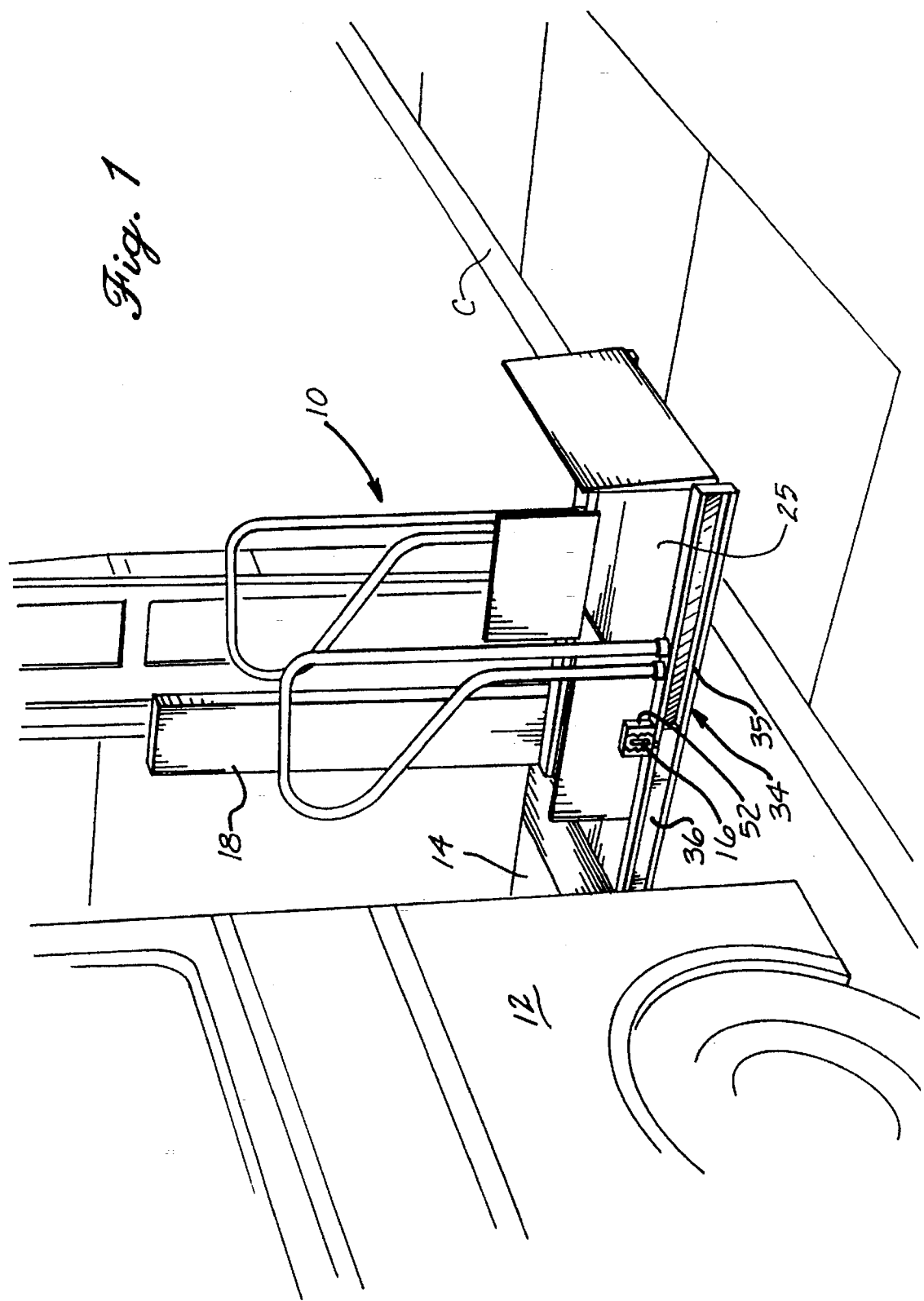
FIG. 1 is a perspective view of an embodiment of a step lift in accordance with the present invention installed in the stairwell of a transit vehicle.
Figure 2:
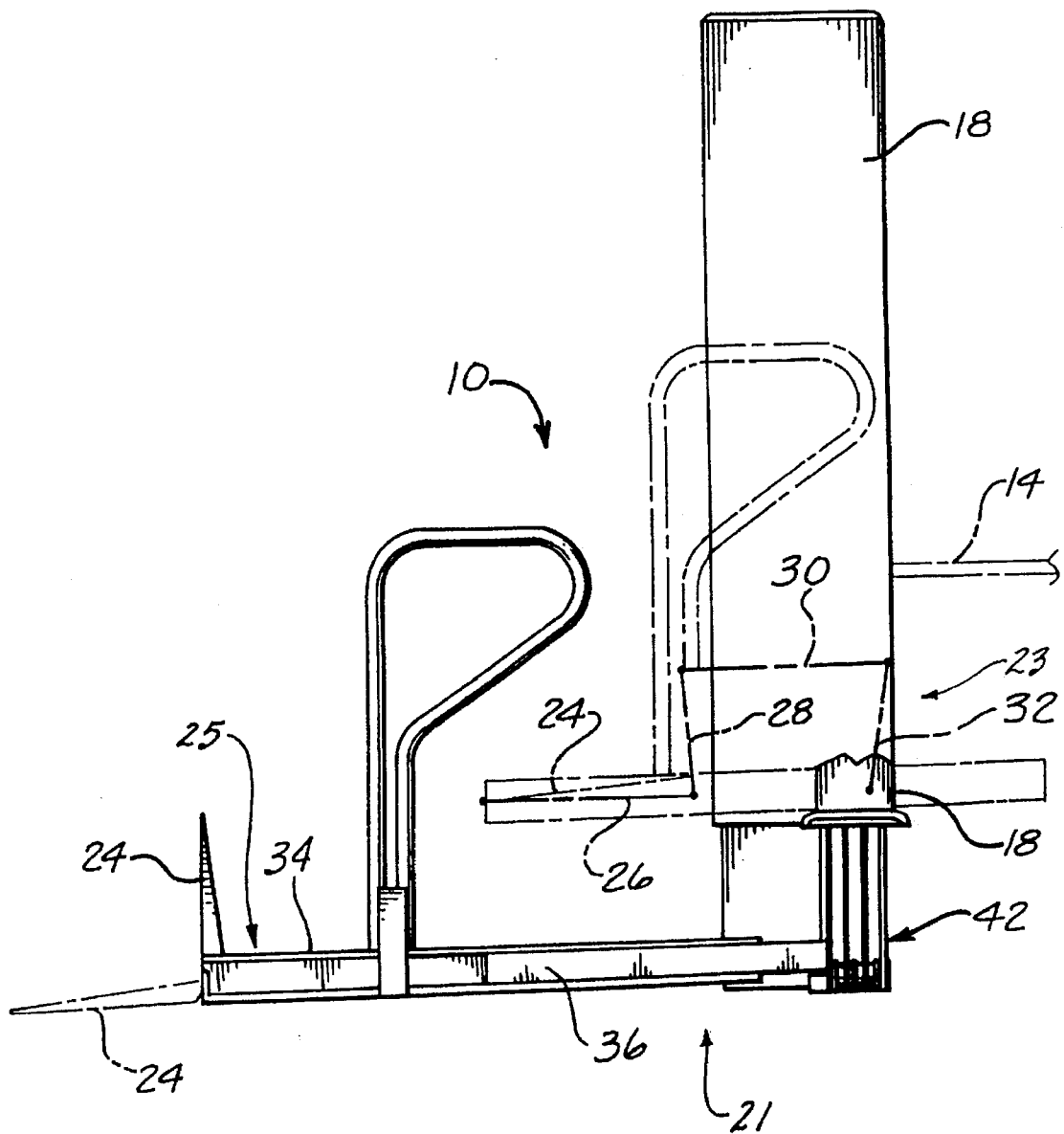
FIG. 2 is a side view of the step lift shown in FIG. 1, with the lift being shown in the platform position in solid view and in the step position in phantom view.

The preferred embodiment of the lift 10 is described generally with reference to FIGS. 1 and 2. The lift 10 is a step lift of the type disclosed in U.S. Pat. No. 4,466,771 to Thorley et al. ("the '771 patent"). For details regarding the structure of the lift 10, one should refer to the '771 patent, which is incorporated herein by reference.

FIG. 1 shows a lift 10 in accordance with the present invention as used in the entryway of a bus 12. The floor 14 of the bus 12 is located a few feet above ground or curb level. The lift 10 is situated in the stairwell of the bus 12 and is operable to transport a passenger between ground level and bus floor level. Typically, passengers enter and exit the bus from a curb at the edge of a street. The lift 10 includes a control system (not shown) designed to stop the lowering of a platform 25 when a sensor 16 indicates that the platform has contacted a curb C or other object.

The lift 10 includes a pair of towers 18 (only one of which is visible in FIG. 1). A carriage assembly 21 is configured to travel up and down between the towers 18. As seen in FIG. 2, attached to the carriage assembly 21, is a step/platform assembly 23 that serves as the steps of the entryway of the bus 12 when the step/platform assembly 23 is in a step position (shown in phantom in FIG. 2), and as a platform 25 for transporting a wheelchair passenger when the step/platform assembly 23 is in a platform position. The step/platform assembly 23 comprises a plurality of hinged plates that can be folded into steps and, alternatively, extended into a platform 25. More specifically, the step/platform assembly 23 includes a barrier plate 24 (FIG. 2), a base plate 26, a riser plate 28, a step plate 30, and a back plate 32.

As seen in FIGS. 1 and 2, the carriage assembly 21 includes a pair of rails 36 (only one of which is visible in FIGS. 1 and 2). The platform 25 includes a pair of slides 34 (only one of which is visible in FIGS. 1 and 2) that slide upon and are supported by the pair of rails 36. As shown in FIG. 2, the slides 34 may be moved between an extended position (illustrated in solid view) and a stowed position (illustrated in phantom view). The barrier plate 24, base plate 26, riser plate 28, step plate 30, and back plate 32 are pivotally attached to one another and are operatively connected to the carriage assembly 21 so as to permit the plates 24, 26, 28, 30, 32 to be moved between a step position (also referred to as the stowed position), illustrated in phantom view in FIG. 2, and a platform position (also referred to as the extended position), illustrated in solid view in FIGS. 1 and 2.

In the step position, one surface of barrier plate 24 forms the first step of the steps of the bus 12, and step plate 30 forms the second step. In the platform position, the barrier plate 24, base plate 26, riser plate 28, step plate 30, and back plate 32 form a substantially planar platform 25. The barrier plate 24 is placed in an upright position as shown in FIG. 1 and in solid view in FIG. 2, when the platform 25 is being used to transport a passenger. The barrier plate 24 is lowered to form a ramp, as shown in phantom view in FIG. 2, when a passenger is to exit or enter the platform.

Figure 3:
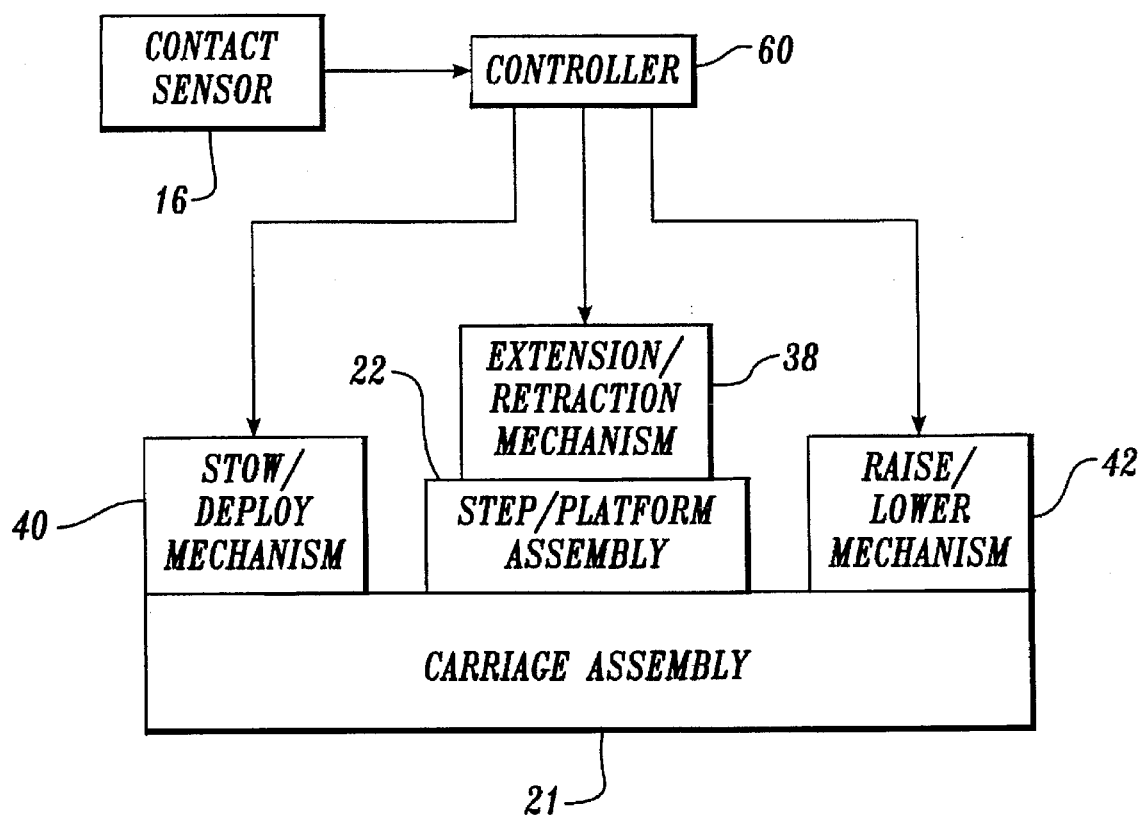
FIG. 3 is a block diagram of the lift having a contact sensor in accordance with the present invention.

As seen in FIG. 3, an extension/retraction mechanism 38 is provided for causing the step/platform assembly 23 to move between the step and platform positions. A stow/deploy mechanism 40 operates in concert with the extension/retraction mechanism 38 to cause the carriage assembly 21 to move between a deployed position and a stowed position. A raise/lower mechanism 42 is coupled to the carriage assembly 21 to cause the carriage assembly 21 and the platform 25 to move between a lower or ground level position, illustrated in solid view in FIG. 2, and an upper or floor level position (not illustrated) in which the platform 25, defined by plates 24, 26, 28, 30, 32 is substantially coplanar with the floor 14 of the bus 12. The structures of the carriage assembly 21, step/platform assembly 23, extension/retraction mechanism 38, stow/deploy mechanism 40, and raise/lower mechanism 42 are well known in the art and are not discussed in detail herein.

The lift 10 also includes a controller 60 (FIG. 3) coupled to the extension/retraction mechanism 38, stow/deploy mechanism 40, and raise/lower mechanism 42, for controlling the operation of these mechanisms. The controller 60 includes a central processing unit. The controller 60 is also coupled to a sensor 16 so as to receive a control signal generated by the sensor 16 when the sensor 16 detects that the platform has contacted the ground, as described below.

Figure 4:
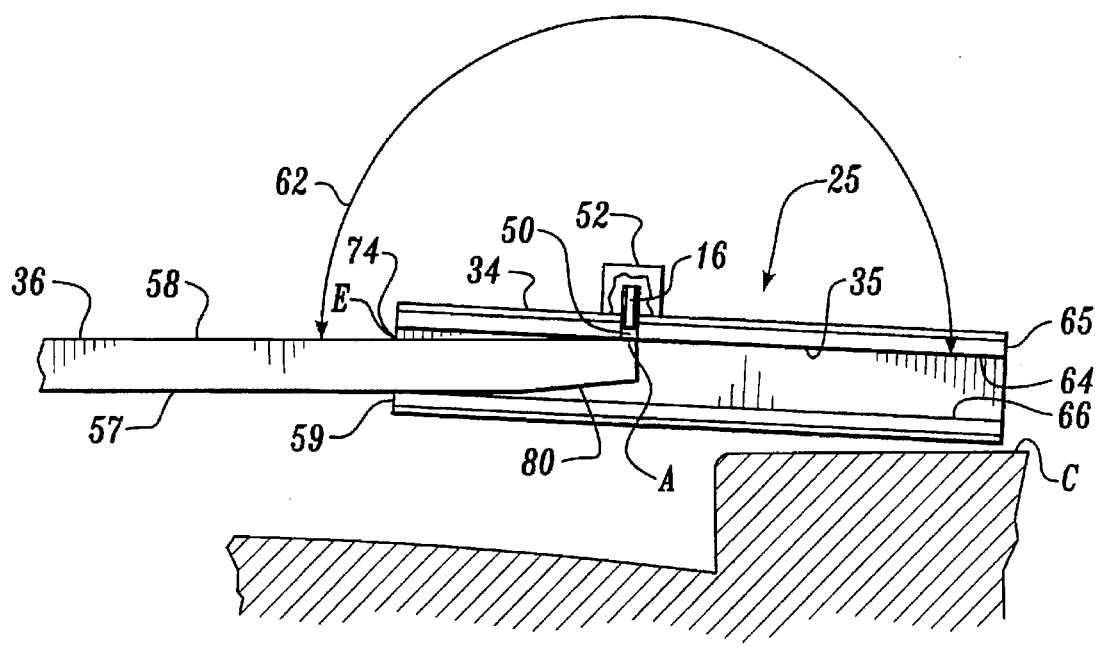
FIG. 4 is a schematic showing the relative position of one of the slides of the carriage assembly and the corresponding rail when the platform is being lowered toward a curb.

Preferably, both the slides 34 and rails 36 are made of metal, and, as seen in FIG. 4, the slides 34 have plastic strips 35 attached to the surfaces that contact the rails 36, specifically, the bottom surface 64 of the top member 65 of the slide, and the top surface 66 of the bottom member 59 of the slide. The strips 35 enable easy sliding of the slides 34 on the rails 36. Although the strips 35 preferably are made of plastic, for example, polyurethane, the strips 35 may be made of any material having a low coefficient of friction that will enable easy sliding of the slides 34. The slides 34 have relatively large clearance with respect to the rails 36 such that, when the step/platform assembly 23 (FIG. 2) is in the platform position, and the platform 25 is in the raised position, the platform and slides 34 hang down at an angle of about 1 degree from the rails 36.

Figure 5:
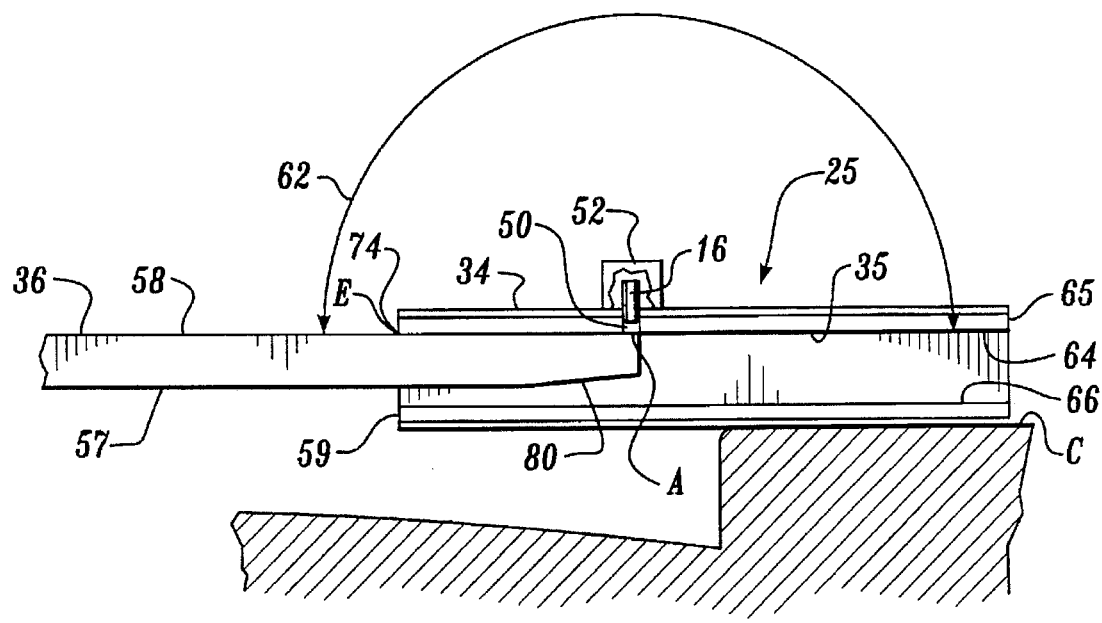
FIG. 5 is a schematic showing the relative position of one of the slides of the carriage assembly and the corresponding rail when the slide is parallel to the rail.
Figure 6:
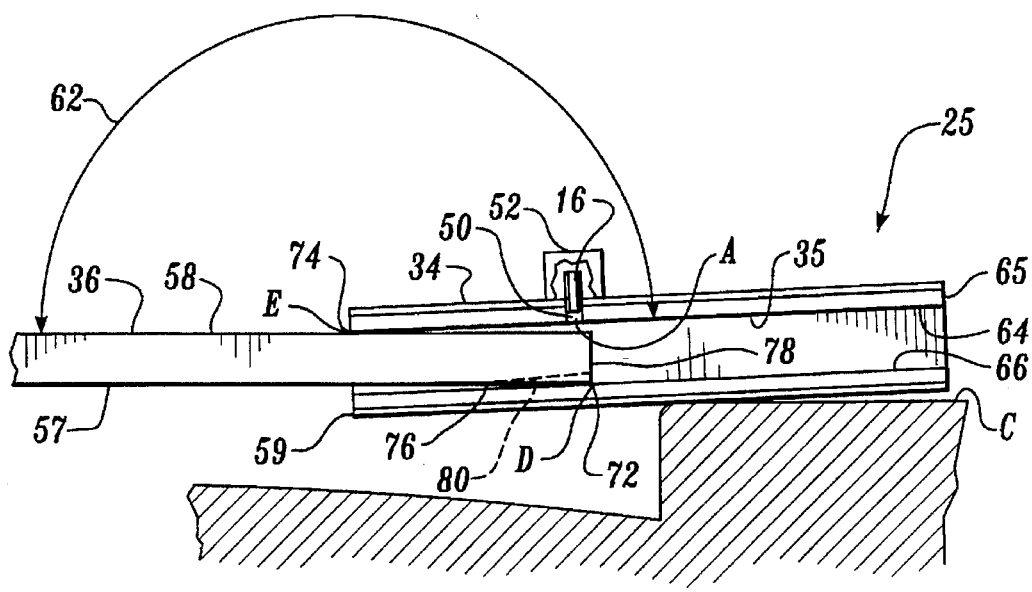
FIG. 6 is a schematic of the prior art lift showing the relative position of one of the slides of the carriage assembly and the corresponding rail when the slide is pitched up from the rail.

FIGS. 4, 5, and 6 are schematics showing the relative position of the platform 25 and one of the slides 34 with respect to the corresponding rail 36: (a) when the platform is being lowered toward a curb (FIG. 4); (b) when the slide 34 is parallel to the rail 36 (FIG. 5); and (c) when the slide 34 is pitched up from the rail 36 (FIG. 6). Such differences have been magnified in the schematics of FIGS. 4, 5, and 6 for purposes of illustration.

FIG. 4 shows the platform 25 hanging down as the platform is being lowered toward the ground. As the carriage assembly 21 (FIG. 1) and the platform 25 continue to travel downwardly, there is a point at which the platform is parallel to the rails 36, as shown in FIG. 5. As the carriage assembly 21 continues to move downwardly, the platform 25 is pitched upwardly from the rails 36, as shown in FIG. 6.

FIG. 4 shows the slide 34 hanging down as the platform 25 coupled with the slide 34 is being lowered toward the ground. FIG. 4 shows the slide 34 and the rail 36 in a first relative position. The angle 62 between the rail 36 and the portion of the slide 34 extending beyond the end of the rail, as seen in FIG. 4, is greater than 180 degrees at this point, though in some embodiments it may be 180 degrees or less. As the carriage assembly 21 and the slide 34 continue to travel downwardly, there is a point at which the slide 34 is parallel to the rail 36, resulting in an angle 62 of 180 degrees, as shown in FIG. 5. As the carriage assembly 21 continues to move downwardly, the slide 34 is pitched upwardly and angularly displaced relative to the rail 36, producing an angle 62 less than 180 degrees, as shown in FIG. 6.

When the platform 25 is being lowered to the curb C, but has not yet contacted the curb C, the top member 65 of the slide 34 contacts the rail 36 at the point designated "A" in FIG. 4, and the sensor 16 is in close proximity to the rail 36. When the platform 25 is parallel to the rail 36, the top member 65 of the slide 34 is still in contact with the rail 36 at point A, as shown in FIG. 5, and the sensor 16 is still in close proximity to the rail 36. However, as the platform 25 is pitched upwardly, the top member 65 of the slide 34 no longer contacts the rail 36 at point A, as shown in FIG. 6, and the distance between the sensor 16 and the rail 36 is increased. The slide 34 and the rail 36 are in a second relative position at this point, the second relative position being characterized by the angular displacement of the rail 36 with respect to the slide 34 such that the sensor 16 detects the change in position from the first relative position. This occurs when the rails are angularly displaced at a predetermined angle with respect to the slides.

As seen in FIGS. 4-6, the sensor 16 is inserted through a hole 50 in the top member 65 of the slide 34 and is shielded by a cover 52 attached to the slide 34 in a conventional manner. The sensor 16 is positioned so as to detect the proximity of the rail 36 in order to determine whether the platform 25 has contacted the ground. In the preferred embodiment, the sensor 16 comprises an inductive proximity switch. When the platform 25 does not contact the curb C (FIG. 4) or is parallel to the curb C (FIG. 5), the sensor 16 is in close proximity to the metal rail 36 such that the sensor 16 detects the presence of metal. During lowering of the platform 25, when the platform 25 contacts the curb C and is pitched upwardly, as shown in FIG. 6, the platform 25 and slides 34 become angularly displaced with respect to the rails 36. As this angular displacement increases, the distance between the sensor 16 and the rail 36 is increased until the sensor 16 no longer detects the presence of the metal rail 36. This change indicates that the carriage and platform 25 are in the lowered position, and that the slide 34 and the rail 36 are in a second relative position. It also indicates that the platform 25 has contacted the curb C.

At this time, the sensor 16 generates a control signal indicating ground contact. Depending on its configuration, the sensor 16 may generate a positive output or zero output when it detects the presence of metal. For example, the sensor 16 may generate a zero output when it detects metal and a positive output when it does not detect metal, or the sensor may generate a positive output when it detects metal and a zero output when it does not detect metal. Thus, the term "control signal" used herein also encompasses a zero output. In response to the control signal, the lift deactivates the raise/lower mechanism, thereby stopping downward movement of the platform.

FIG. 6 shows a rail 36 of the prior art, having a top surface 58 and bottom surface 57 that are parallel with each other, each surface being substantially planar. At the position shown in FIG. 6, the bottom corner 72 of the prior art rail 36 farthest from the vehicle contacts the slide 34 at point D, while a corner 74 of the slide closest to the vehicle contacts the top surface 58 of the rail at point E. This illustrates the maximum amount of angular displacement of the slide 34 relative to the rail 36, which characterizes the third relative position. Any further lowering of the carriage results in downward pressure on the bottom member 59 of the slide 34 at point D by the bottom corner 72 of the rail.

As discussed in the Background of the Invention, for prior art lifts of the type described above, as the outside edge of the platform 25 contacts the curb C, a portion of the weight of the platform, and thus the wheelchair lift, is transferred to the curb. As this occurs, the suspension system of the bus causes the side of the bus on which the wheelchair lift is mounted to move upward. This movement can prevent a sufficient gap from being created between the sensor 16 and top surface 58 of the rail 36 to trigger the sensor 16 and thus stop movement of the wheelchair lift. In addition, movement inside the interior of the vehicle can cause it to rock. This rocking movement of the vehicle in turn can prevent a sufficient gap from being created to trigger the sensor 16. Alternatively, the rocking of the vehicle can cause the sensor 16 to be repeatedly triggered. In some situations, the repeated triggering of the sensor 16 can cause the wheelchair lift to begin its upward cycle thus causing the barrier plate 24 to rotate upward at an inappropriate time.

Figure 7:
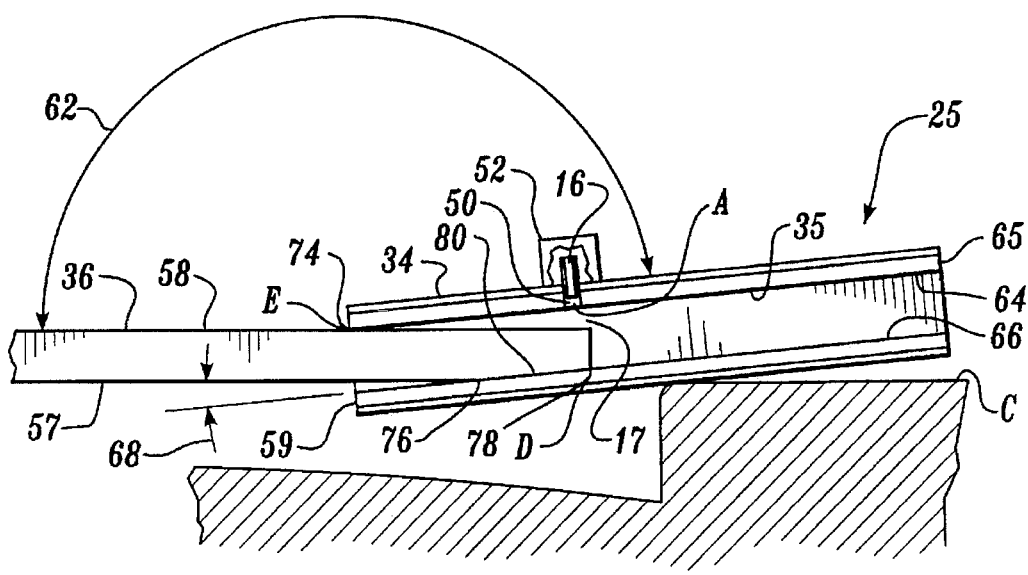
FIG. 7 is a schematic of the present invention showing the relative position of one of the slides of the carriage assembly and the corresponding rail when the platform is pitched up from the curb.

FIG. 7 shows the third relative position of the preferred embodiment of the invention using a rail 36 having a tapered outer portion 80. The outer portion 80 of the rail 36 is tapered so that the bottom surface 57 of the rail is not substantially planar. The tapered outer portion 80 extends between a point 76 on the bottom surface 57 and the outer bottom corner 78 of the rail. Tapering the rail 36 allows a greater angular displacement of the slide 34 with respect to the rail 36, when the platform is in the lowered position, and therefore a smaller angle 62, before contact is made between the bottom surface 57 of the rail 36 and the slide 34. With tapering, the bottom surface 57 of the rail 36 may contact the slide 34 at any point along the tapered outer portion 80, the exact point depending on the shape and amount of tapering. FIG. 7 shows tapering such that the entire tapered outer portion 80, between the beginning point 76 of the tapering and the bottom corner 78 of the rail end, contacts the slide 34. The tapered outer portion 80 is shown in phantom view in FIG. 6, for comparison. The extra angular displacement between the second relative position (FIG. 6) and the third relative position (FIG. 7) provides an increased distance 17 between the slide 34 at point A and the top surface 58 of the rail 36. The additional angular displacement between the second and third relative positions allowed by the tapered rail prevents rocking of the vehicle from triggering the sensor 16 at inappropriate times.

In the preferred embodiment, the rail 36 is approximately 2.17 inches in height; the beginning point 76 of the tapering is approximately 12.37 inches from the rail end; and the bottom corner 78 of the tapered rail end is approximately 1.55 inches from the top surface 58 of the rail 36, thereby creating an angle 68 of approximately 3.19 degrees between the bottom surface 57 of the rail 36 on the vehicle side and the tapered outer portion 80 of the rail end. As can be seen in FIG. 7, the bottom surface 57 of the rail 36 generally lies within a first plane from the vehicle side of the rail to a point 76 along the bottom surface 57, and generally lies within a second plane from the point 76 to the outer bottom corner 78 of the rail 36, where the second plane is angularly displaced relative to the first plane.

Figure 8:
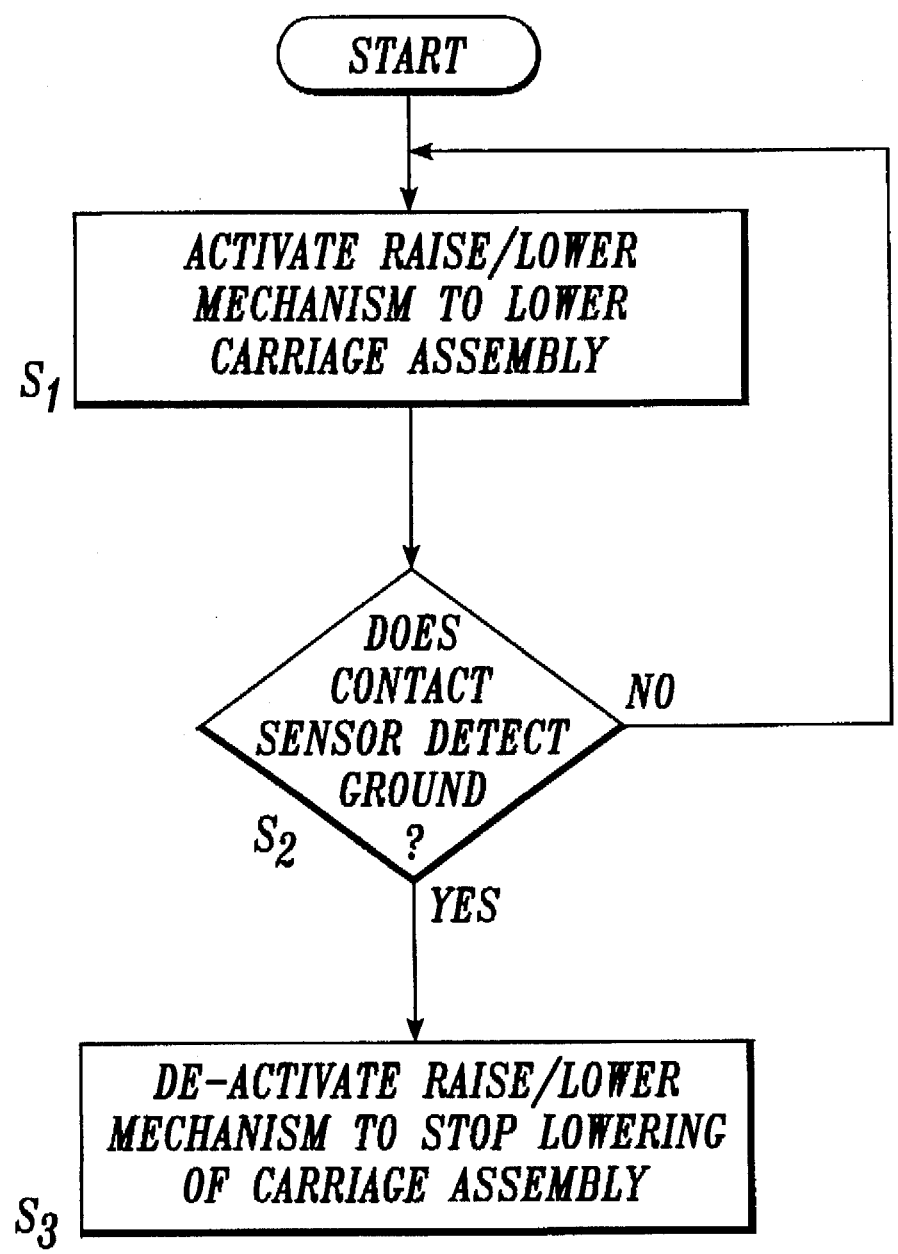
FIG. 8 is a flow diagram showing the operational steps of the controller during lowering of the lift platform.

FIG. 8 shows a flow diagram of a step lift having a sensor in accordance with the present invention. The step/platform assembly 23 (FIG. 2) is in the platform position and is ready to be lowered. The raise/lower mechanism 42 is activated to lower the carriage assembly 21, and hence the platform ($S_1$). The controller 60 then determines if the sensor 16 has generated a control signal indicating that the platform 25 has contacted the ground ($S_2$). If the sensor 16 (FIG. 4) indicates that ground contact has not been made, activation of the raise/lower mechanism 42 to lower the carriage assembly 21, and thus the platform 25, continues. If the sensor 16 indicates that ground contact has been made, the controller 60 causes deactivation ($S_3$) of the raise/lower mechanism 42 to stop lowering of the carriage assembly 21, and thus of the platform 25.

The presently contemplated best mode of carrying out the invention has been described above. Nevertheless, it should be understood that various modifications can be made to the preferred embodiment without departing from the spirit and scope of the invention. For example, in alternate embodiments, the tapered outer portion 80 of the rail 36 can be replaced by a rail that curves upward or has a step at the end.

The embodiments of the invention in which an exclusive property or privilege is claimed are defined as follows:

1. A wheelchair lift designed to be installed in the entryway of a vehicle, the lift comprising:
   (a) a carriage attachable to the vehicle and movable between an upper position and a lower position, the carriage including a pair of rails, each rail having a tapered outer portion;
   (b) a platform attached to the carriage and movable between the upper and lower positions along with the carriage, the platform including a pair of slides that slide upon and are supported by a pair of rails, the tapered portion of the rails allowing the slides and, thus, the platform to be angularly displaced with respect to the rails when the carriage and platform are in the lowered position;
   (c) a mechanism coupled to the carriage to move the carriage and platform between the upper and lower positions; and
   (d) a sensor operatively connected to the platform to detect the angular displacement of the rails with respect to the slides and to provide a control signal indicative of when the platform and carriage are in the lower position when the rails are angularly displaced at a predetermined angle with respect to the slides, wherein the mechanism stops the downward movement of the carriage and platform in response to the control signal.

2. The lift of claim 1, wherein the sensor produces the control signal when the platform contacts a curb, and wherein the control signal provides an indication of when the platform contacts the curb and wherein the wheelchair lift stops downward movement of the platform in response to the control signal.

3. The lift of claim 1, wherein the lift is a step lift.

4. The lift of claim 3, wherein the platform includes a plurality of panels wherein each panel is pivotally connected to an adjacent panel, and wherein the plurality of panels may be moved between a step position in which the panels form at least one step and a platform position in which the panels form a substantially planar platform.

5. The lift of claim 1, wherein the lift is a platform lift.

6. The lift of claim 1, wherein the slides are angularly displaced with respect to the rails when the platform contacts a curb.

7. The lift of claim 1, wherein the sensor detects a change of position of the slide and generates a control signal when the sensor detects that the slide is sloped upward toward the curb, the control signal functioning as an indication to stop movement of the platform.

8. The lift of claim 7, wherein each rail has a bottom surface that generally lies within a first plane from one end of the rail to a point on the bottom surface, and generally lies within a second plane from said point to a second end of the rail, the second plane being angularly displaced relative to the first plane.

9. A wheelchair lift designed to be installed in the entryway of a vehicle, the wheelchair lift comprising:
   (a) a carriage attachable to the vehicle and movable between an upper position and a lower position;

(b) a platform assembly attached to the carriage and including a plurality of panels, wherein each panel is pivotally connected to an adjacent panel, and wherein the plurality of panels may be moved between a step position in which the panels form at least one step and a platform position in which the panels form a substantially planar platform, the platform being movable between an upper position and a lower position;

(c) a pair of slides operatively connected to the platform assembly;

(d) a pair of rails on which the pair of slides ride, the slides and rails assuming a first relative position when the platform assembly is in the upper position and a second relative position when the platform assembly is in the lower position, the rails having tapered outer portions located at an outer end of the rails, the tapered outer portions allowing the pair of rails to be angularly displaced from the pair of slides when the platform assembly is in the lowered position;

(e) a mechanism operatively connected to the platform assembly to move the carriage and platform assembly between the upper and lower positions; and (f) a sensor that detects the angular displacement of one of the slides and corresponding rails and generates a control signal indicative of when the platform assembly is in the lower position when the sensor detects that the angular displacement of the slide with respect to the corresponding rail is the second relative position.

10. The wheelchair lift of claim 9, wherein the control signal is generated during lowering of the platform, and the control signal terminates lowering of the platform.

11. The wheelchair lift of claim 10, wherein the slide contacts the curb when the platform assembly is in the lower position, and wherein contact between the slide and the curb causes the slide to be angularly displaced with respect to the rails.

12. The lift of claim 11, wherein each rail has a bottom surface that generally lies within a first plane from one end of the rail to a point on the bottom surface, and generally lies within a second plane from said point to a second end of the rail, the second plane being angularly displaced relative to the first plane.

\* \* \* \* \*